UNITED STATES PATENT OFFICE.

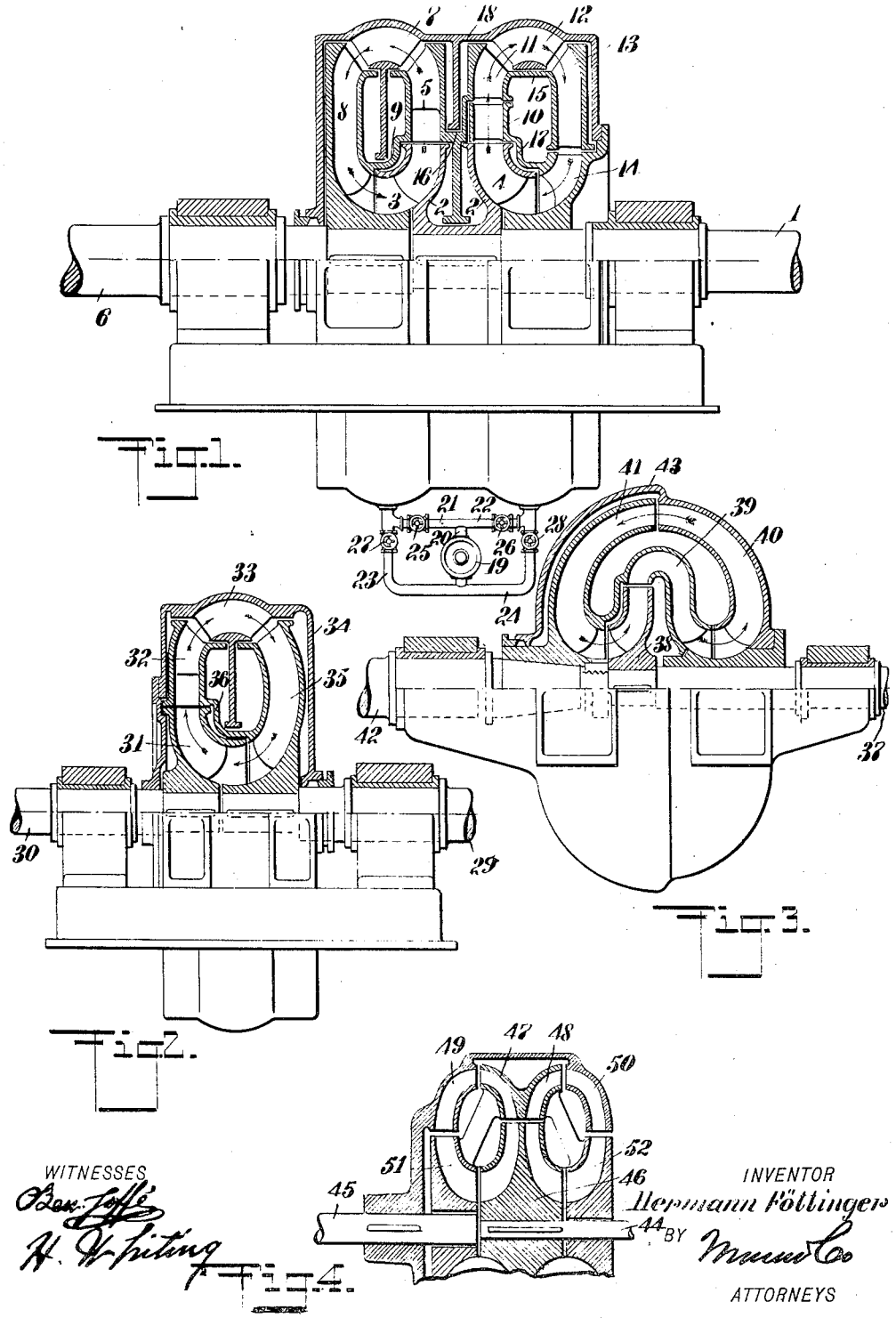

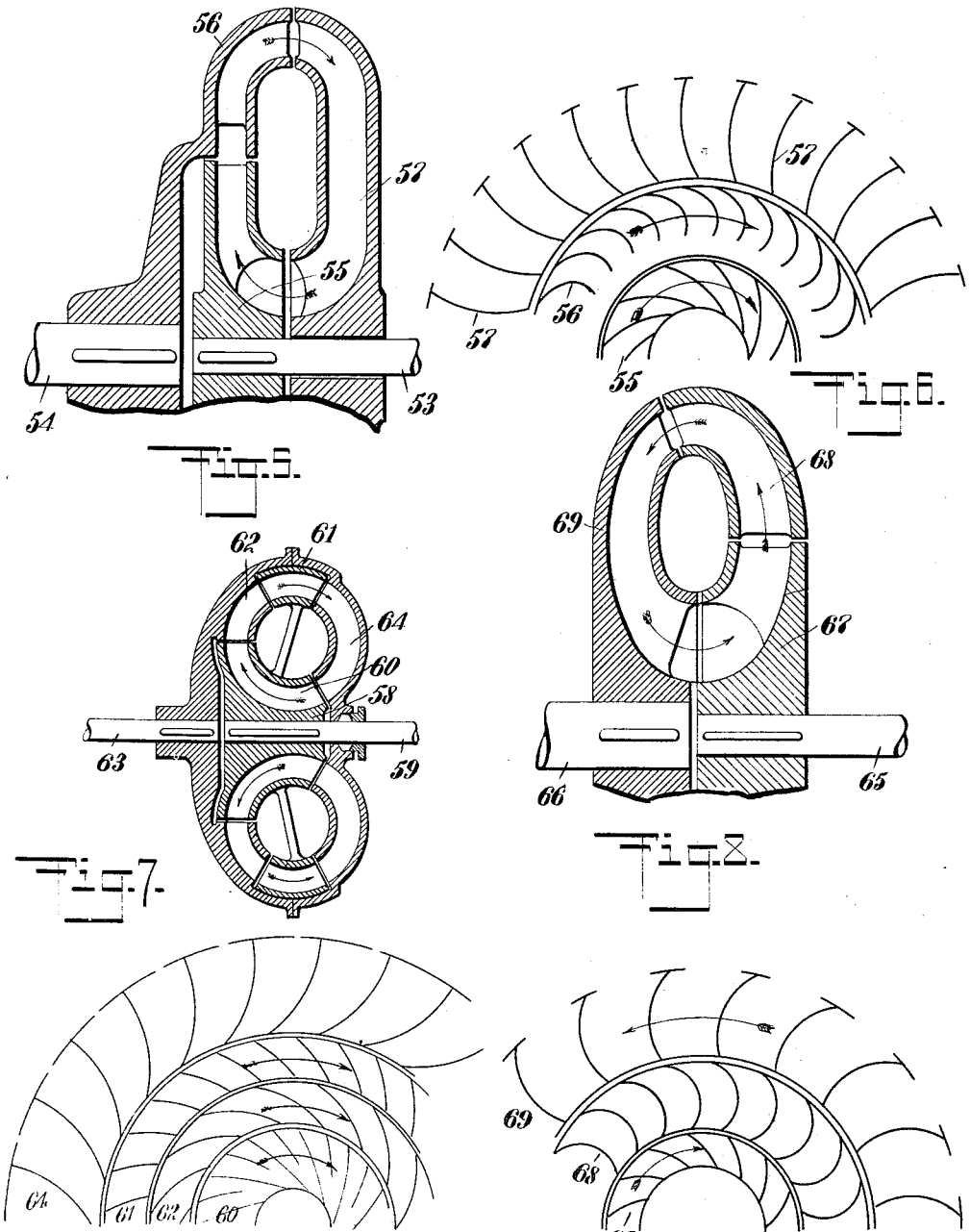

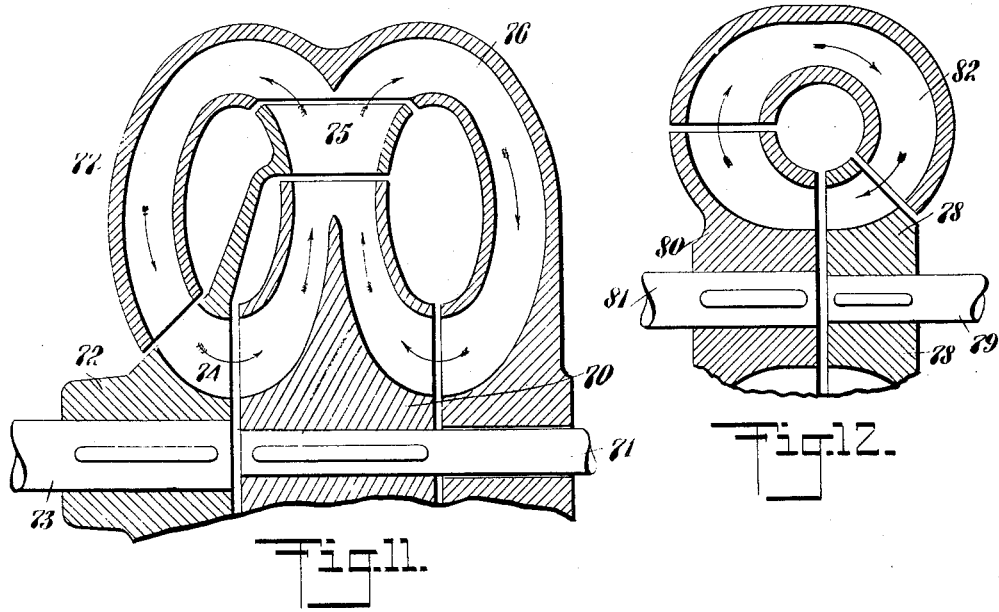
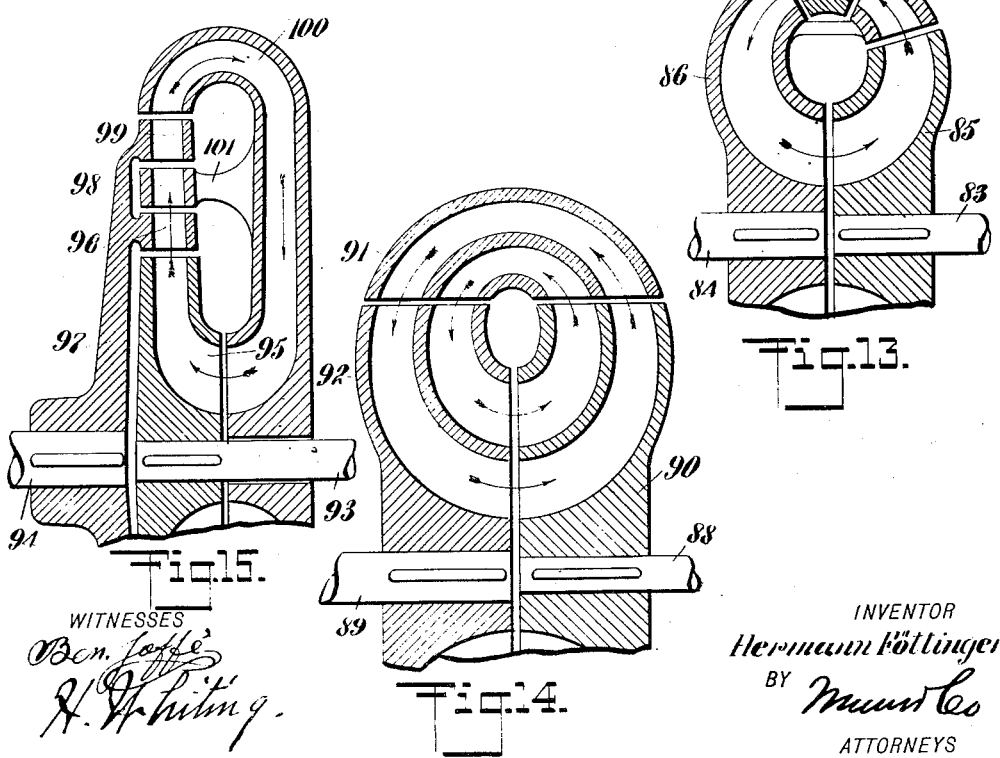

HERMANN FÖTTINGER, OF STETTIN, GERMANY.

TRANSMISSION DEVICE.

1,199,360.  Specification of Letters Patent.  Patented Sept. 26, 1916.

Application filed January 26, 1910. Serial No. 540,162.

*To all whom it may concern:*

Be it known that I, HERMANN FÖTTINGER, a subject of the King of Bavaria, and a resident of Stettin, Germany, have invented a new and Improved Transmission Device, of which the following is a full, clear, and exact description.

This invention relates to certain improvements in hydraulic power transmitters of that type in which a centrifugal pump impeller and a turbine rotor, constituting the driving and driven members, are suitably juxtaposed, whereby the liquid thrown out from the impeller by centrifugal force may impinge upon and produce the desired rotation of the driven member, both by the fluid velocity energy and the fluid pressure energy. The kinetic energy of the liquid is absorbed in the driven member and said liquid is then guided back to the inlet of the propeller. In such hydraulic power transmitters the driving and driven members are preferably arranged co-axially on shafts, in alinement with each other and the space between the driving and driven members is made as short as possible to utilize to the fullest extent the kinetic energy of the liquid traveling at high velocity.

In my prior and co-pending application, Serial No. 322,395, filed June 19th, 1906, I have disclosed a considerable number of different forms which I have devised and by means of which the desired results may be secured. In certain of these forms the inlet of the driven member is disposed closely adjacent to the outlet from the driving member, and the outlet from the driven member is disposed closely adjacent to the inlet of the driving member, whereby the two members define the entire circuit for the liquid. In other forms, non-rotatable, annular, liquid guiding members are interposed in the circuit, either to return the liquid from the driven member to the driving member or to guide the liquid from the driving to the driven member, in such a way as to effect rotation of the driven member in the same or the opposite direction in respect to the direction of rotation of the driving member. I have also disclosed wherein the guiding member may be either stationary or adjustable to regulate or control the rate or direction of rotation. In said application, I have claimed my invention broadly and have claimed specifically the particular type in which the driving and driven members make up the entire circuit.

My present application is made up largely of subject-matter divided from the application above referred to, and herein I claim broadly those forms in which a non-rotatable annular guiding member is interposed in the circuit. I also claim more specifically a preferred construction in which the driven member includes two or more successive stages which may have interposed therebetween guiding sections for re-directing the liquid against a second stage after a portion of its energy has been absorbed in a first stage of the driven member. I am also claiming herein specifically that type in which separate liquid circuits are employed from either of which the liquid may be withdrawn and transferred to the other, and the members making up said circuits being so designed that when one is in operation the driven member will rotate in one direction and when the other is in operation, the driven member will be rotated in the opposite direction. Of those forms in which a non-rotatable, annular, guiding member is employed, I specifically herein claim those arrangements in which portions of the driving and driven members are concentric and the liquid passes from one to the other in a radial plane. Such forms as involve the transferring of the fluid from a peripheral series of outlets in the driving member to a peripheral series of inlets in the driven member by a liquid guiding member encircling the two, are claimed specifically in my co-pending application, Serial No. 842,409 filed June 2, 1914. Such forms as involve a movement, regulation or adjustment of the members in respect to each other, to control the speed or direction of rotation of the driven member, are made the subject-matter of a co-pending application, Serial No. 540,163, filed on even date herewith.

The main object of my present invention is to insure a more complete absorption of the energy contained in the liquid and to utilize it in the most effective manner for driving the driven member in either direction in respect to the direction of rotation of the driving member.

Reference is to be had to the accompanying drawings forming a part of this specification, in which—

Figure 1 is a view in elevation, partly in section, showing one form of my device, in which a plurality of circuits for the operative medium are provided, whereby the secondary wheel may be driven in either direction; Fig. 2 is a view in elevation, partly in section, showing another form of my device, which gives a considerable reduction in the number of revolutions from the primary to the secondary shaft; Fig. 3 is a view in elevation, partly in section, of another form, in which the forces exerting end thrusts on the secondary shaft are balanced; Fig. 4 is a fragmentary vertical section showing a form in which a plurality of circuits are provided for the operative medium, whereby the direction of rotation of the secondary wheel may be reversed; Figs. 5, 7 and 8 are diagrammatical views of other forms of my device; Figs. 6, 9 and 10 are diagrammatical views showing the relative curvature of the vanes of the forms illustrated respectively in Figs. 5, 7 and 8, and also illustrating the relative rotation of the turbine wheels; and Figs. 11 to 15 are views illustrating diagrammatically various other embodiments of my invention. Of these various different forms Figs. 4, 5, and 11 to 15, inclusive, are copied directly from my prior and co-pending application 322,395, above referred to.

Referring more particularly to Fig. 1, 1 indicates a primary shaft, to which is secured in any well known manner, a primary turbine wheel 2. In this form, the primary turbine wheel 2 is adapted to supply energy to an operative fluid in any one of a plurality of circuits, two of which are shown. The fluid, which is engendered with both velocity and pressure energies in the primary turbine wheel, may be of any suitable form, such as water, either hot or cold, ether, petroleum or mercury, according to the conditions desired. The primary turbine wheel 2 is provided with two sections 3 and 4, which are adapted to energize the motive fluid in separate circuits. These sections 3 and 4 are provided with vanes throughout their circumference, which may be of any form and inclined or curved in any manner. The section 3 delivers the operative fluid directly to a first stage 5 on a secondary wheel, which is secured in any well known manner to a secondary shaft 6. The stage 5 is provided with vanes or blades, which are adapted to absorb the velocity energy from the operative fluid. The operative fluid is delivered from the first stage 5 to a stationary guide wheel 7, which is provided with guides or vanes, which are adapted to direct the flow of the operative fluid in such a manner as to permit the pressure energy and the remaining velocity energy to be absorbed in a succeeding second stage 8 on the secondary turbine wheel. The second stage 8 is provided with blades, conformed in such a manner as to best absorb the remaining energy in the operative fluid. The second stage 8 delivers the operative fluid back into the intake side of the section 3 on the primary turbine wheel. The operative fluid thus circulates from the primary turbine wheel through the stages on the secondary turbine wheel and the intermediate stationary guide wheel. The stages 5 and 8 on the secondary turbine wheel are operatively connected together by means of a member 9 which extends between them. The number of these stages in the secondary turbine wheel may be varied according to the conditions desired. There is thus obtained a transmission power from the primary shaft 1 to the secondary shaft 6 in one direction. In order to transmit power from the primary shaft to the secondary shaft in the opposite direction, the section 4 on the primary turbine wheel which operates in another circuit, delivers the operative fluid first into a stationary guide wheel 10, which is provided with suitable vanes or blades, so conformed as to direct the operative fluid in such a manner as to transmit its energy in the reverse direction, to a first stage 11 on the secondary turbine wheel above-mentioned. The first stage 11 is provided with suitable vanes or blades, which are so conformed as to best absorb the velocity energy in the motive fluid, and in such a manner as to give an opposite rotation to the secondary turbine wheel from that which it would receive from the first and second stages 5 and 8 in the other circuit. The motive fluid passes from the first stage 11 on the secondary turbine wheel to a guide wheel 12 which is provided with suitable vanes or blades, so conformed as to direct the motive fluid to a second stage 13 on the secondary turbine wheel, and in such a manner that the pressure energy in the operative fluid will be absorbed in its second stage. The second stage 13 is provided with blades or vanes, which are adapted to best absorb the pressure energy in the operative fluid. This second stage 13 delivers the operative fluid through a fixed return guide wheel 14, which is provided with vanes or guides, into the intake side of the section 4 on the primary turbine wheel.

The first and second stages 11 and 13 are connected together in any manner, as by means of a member 15. These stages are also connected to the stages 5 and 8 by means of a connection 16, thereby connecting the four stages into one complete secondary turbine wheel, which, as has been stated above, is secured in any well known manner to the secondary shaft 6. The stationary guides 10 and 14 are also interconnected by means of a connection 17. The stationary guide wheels 7 and 12 are preferably formed in part of a fixed casing 18, which interconnects them and forms an inclosure for the rotating wheels of the structure and for the driving fluid. The casing is preferably so designed that it follows the contour of the rotatable members and thus substantially all of the fluid within the casing is within the circuit.

It is perfectly obvious that both the circuits between the primary and secondary turbine wheels cannot be operated at the same time. There is therefore provided means for drawing the operative fluid from either of the circuits, and also means for supplying the operative fluid to either of the circuits. The particular means illustrated draws the fluid from one circuit and forces it into the other circuit. This means consists of a pump 19, which is adapted to draw, through a connecting pipe 20, having branches 21 and 22, the operative fluid from either of the circuits. The pump supplies this operative fluid, drawn from either of the circuits, to the other of the circuits, by means of suitable connecting pipes 23 and 24. All of these connecting pipes are provided with suitable shut-off valves 25, 26, 27 and 28, by means of which the proper connections to the different circuits, may be obtained. By opening valves 26 and 27 and closing valves 25 and 28, the fluid can be delivered from one circuit to the other, and by reversing each of the valves the fluid can be returned. There is thus provided means for drawing off the operative fluid from one circuit to render the latter idle, and supplying the operative fluid to another circuit, rendering said last mentioned circuit active, thereby reversing the direction of transmission from the primary shaft to the secondary shaft.

The form illustrated in Fig. 2 is adapted to give a considerable reduction in the number of revolutions from a primary shaft 29 to a secondary shaft 30. The primary shaft 29 has secured thereto in any well known manner, a primary turbine wheel 31, which delivers directly into a first stage 32 of a secondary turbine wheel, which is secured to the secondary shaft 30 in any well known manner. The first stage 32 delivers, through a suitable fixed guide wheel 33 on a fixed casing 34, to a second stage 35 on the secondary turbine wheel, which is rigidly connected to the first stage 32 by means of a connection 36. The second stage 35 delivers back into the intake side of the primary turbine wheel 31. The primary turbine wheel, the guide wheel and the stages on the secondary turbine wheel, are provided with suitable vanes or blades, conformed in such a manner as to transmit the power from the primary shaft 29 to the secondary shaft 30, in the most efficient manner.

The form illustrated in Fig. 3 shows a device in which the secondary turbine wheel is arranged in two stages in such a manner as to partially balance the end thrust on the secondary shaft. In this figure, 37 represents the primary shaft, on which is secured a primary turbine 38. The primary turbine 38 energizes the operative fluid and delivers it into the first stage 39 of the secondary turbine wheel, which is adapted to absorb the velocity energy from the operative fluid. The first stage 39 delivers into a fixed wheel guide 40, which directs the operative fluid to a second stage 41 on the secondary turbine wheel, which returns the operative fluid to the intake side of the primary turbine 38. A secondary turbine wheel is secured in any well known manner on the secondary shaft 42, and is preferably inclosed by a casing 43 which is formed on the stationary guide wheel 40.

Fig. 4 illustrates a form similar to Fig. 1, in which there are provided two circuits for the operative fluid, so that the power may be transmitted from a primary shaft 44 to a secondary shaft 45 in either direction. Similar to the form shown in Fig. 1, the reversal of the transmission is obtained by removing the operative fluid from one of the circuits and supplying the other circuit with said operative fluid. In this form, there is provided a primary turbine wheel 46, which has two sections that deliver directly into stationary guide wheels 47 and 48, which in turn deliver into single stages 49 and 50 on the secondary turbine wheel, which are adapted to absorb the whole power in the fluid and return it through stationary guide wheels 51 and 52, to the primary turbine wheel 46. The guide members 47, 48, 51 and 52 are interconnected, so as to be substantially integral.

The form illustrated in Fig. 5 is of a type adapted to give a considerable reduction in the number of revolutions from the primary shaft 53 to a secondary shaft 54. This form consists of a primary turbine wheel 55, a secondary turbine wheel 56, and a stationary return guide wheel 57. The blades on these various wheels are curved in the manner illustrated in Fig. 6, so that the secondary turbine wheel 56 rotates in the same direction as the primary turbine wheel 55.

Fig. 7 illustrates a form in which a primary turbine wheel 58 transmits the power from a primary shaft 59 by means of two stages 60 and 61, which are interposed between a secondary turbine wheel 62 on a secondary shaft 63, and a fixed guide wheel 64.

The diagram in Fig. 9 illustrates the curvature of the blades on the various wheels, and these blades are so conformed as to transmit the rotation from the primary turbine 58 to the secondary turbine 62 in the same direction.

Figs. 8 and 10 illustrate a form in which the power is transmitted from a primary shaft 65 to a secondary shaft 66 in the reverse direction. This form consists in a primary turbine wheel 67 secured to the primary shaft 65 in any well known manner, and energizes the motive fluid which is transmitted through a fixed guide wheel 68 to a secondary turbine wheel 69 on the secondary shaft 66. The curvature of the vanes and blades on the wheels in this form is so formed, as is indicated in Fig. 10, that the motive fluid is directed in such a manner as to drive the secondary turbine wheel 69 in the opposite direction to the direction of rotation of the primary turbine wheel 67.

Fig. 11 illustrates a form in which the circuit used in transmitting power from a primary turbine wheel 70 on a primary shaft 71 to a secondary turbine wheel 72 on a secondary shaft 73, is divided into two parts, so as to substantially balance the axial thrust on the shafts 71 and 73. The secondary turbine wheel is divided into two stages 74 and 75. From the stage 75, the fluid divides and goes part to the right by means of a stationary guide 76 back to the turbine wheel 70, and part to the left through the stationary guide 77, and also through the second stage 74 back into the primary turbine 70. The stationary guides 76 and 77 are connected, so that the pressure on them is evenly balanced.

In the form illustrated in Fig. 12, there is provided an axle turbine pump 78 on a primary shaft 79, which energizes the motive fluid and delivers it directly to an axially impinged radial turbine 80 on a secondary shaft 81. The spent motive fluid is returned through a stationary guide 82 to the turbine pump 78.

Fig. 13 illustrates the form in which there is a completely closed circuit. Power is transmitted from a primary shaft 83 to a secondary shaft 84 by means of the operative fluid energized by a primary turbine 85, and deënergized by a two-stage secondary turbine wheel 86 on the secondary shaft 84. A stationary guide wheel 87 is also provided between the two stages of the secondary turbine wheel, so that the pressure energy remaining in the motive fluid after the velocity energy has been absorbed by the first stage, will be absorbed by the second stage.

Fig. 14 illustrates another form of turbine, in which the power may be transmitted from a primary shaft 88 to a secondary shaft 89, either in the same or in the reverse direction. There are provided for this purpose two concentric circuits. Reversing is effected by admitting the fluid to one circuit and simultaneously evacuating the fluid from the other circuit in any suitable manner as, for instance, by a pump and connections, as shown in Fig. 1. A primary turbine 90 on the primary shaft 88, has two energizing portions registering with juxtaposed passageways in a fixed guide 91, which latter register with two passages on a secondary turbine wheel 92 on the secondary shaft 89. The secondary turbine wheel returns the fluid directly to the primary turbine wheel. The vanes in the two sets of passageways in the guide 91 are so formed that the fluid when in one circuit will be delivered to the secondary wheel to rotate the latter in one direction and when in the other circuit will be delivered to the secondary wheel at such an angle as to rotate the latter in the opposite direction. One set of vanes in the stationary member would guide the fluid forwardly so that the latter would impact against the vanes of the secondary wheel and the other set of vanes in the stationary member would be curved as shown in 68 in Fig. 10, so that the fluid would strike them and react into the secondary wheel 69.

Fig. 15 illustrates a form in which there is considerable reduction in the number of revolutions from a primary shaft 93 to a secondary shaft 94. A primary turbine wheel 95 on the primary shaft 93 imparts energy to a motive fluid, which is directed into the first stage 96 of a secondary turbine wheel 97 on the secondary shaft 94. A stationary guide 98 directs the flow of the operative fluid from the first stage 96 to a second stage 99, from whence it flows back through a stationary guide 100 to the primary turbine 95. The stationary guides 98 and 100 are connected together by a suitable member 101.

While I have shown various structural forms as illustrating embodiments of my invention, I do not wish to be limited to any of these forms, but desire to cover the idea of transmitting power from one shaft to another by fluid pressure means, comprising a primary turbine wheel and a secondary turbine wheel, with the interposition of a fixed guide member to take up the reaction of the operative fluid in passing from the primary turbine wheel to the secondary turbine wheel.

Having thus described my invention, I claim as new and desire to secure by Letters Patent:—

1. In a transmission device, the combination with a primary shaft, of a secondary shaft, and means for transmitting power from said primary shaft to said secondary shaft, comprising a primary turbine wheel, a secondary turbine wheel, and a guide wheel juxtaposed to said first-mentioned wheels.

2. In a transmission device, the combination with a primary shaft, of a secondary shaft, and means for transmitting power from said primary shaft to said secondary shaft, comprising a primary turbine wheel, a secondary turbine wheel, and a stationary guide wheel juxtaposed to said first-mentioned wheels.

3. In a transmission device, the combination with a primary shaft, of a secondary shaft, and means for transmitting power from said primary shaft to said secondary shaft, comprising a primary turbine wheel, a secondary turbine wheel, and a guide wheel interposed between said first-mentioned wheels and receiving fluid directly from one and delivering directly to the other.

4. In a transmission device, the combination with a primary shaft, of a secondary shaft, and means for transmitting power from said primary shaft to said secondary shaft, comprising a primary turbine wheel, and a multiple-stage secondary turbine wheel.

5. In a transmission device, the combination with a primary shaft, of a secondary shaft, and means for transmitting power from said primary shaft to said secondary shaft, comprising a primary turbine wheel, and a double-stage secondary turbine wheel.

6. In a transmission device, the combination with a primary shaft, of a secondary shaft, and means for transmitting power from said primary shaft to said secondary shaft, comprising a primary turbine wheel, a multiple-stage secondary turbine wheel, and a guide-wheel juxtaposed to said first-mentioned wheels.

7. In a transmission device, the combination with a primary shaft, of a secondary shaft, and means for transmitting power from said primary shaft to said secondary shaft, comprising a primary turbine wheel, a multiple-stage secondary turbine wheel, and a guide wheel interposed between the stages of said secondary turbine wheel.

8. In a transmission device, the combination with a primary shaft, of a secondary shaft, and means for transmitting power from said primary shaft to said secondary shaft, comprising a primary turbine wheel, a multiple-stage secondary turbine wheel, and a guide wheel interposed between said primary turbine wheel and said secondary turbine wheel.

9. In a transmission devise, the combination with a primary shaft, of a secondary shaft, and means for transmitting power from said primary shaft to said secondary shaft, comprising a primary turbine wheel, a multiple-stage secondary turbine wheel, a guide wheel interposed between the stages of said secondary turbine wheel, and a guide wheel interposed between said primary turbine wheel and said secondary turbine wheel.

10. In a transmission device, the combination with a primary shaft, of a secondary shaft, fluid turbine means on said primary shaft, and fluid turbine means on said secondary shaft, fluid guiding means therebetween, one of said turbine means including a plurality of circuits.

11. In a transmission device, the combination with a primary shaft, of a secondary shaft, a plurality of fluid turbine transmission circuits adapted to transmit power from said primary shaft to said secondary shaft, and means for removing the operative fluid from any of said circuits.

12. In a transmission device, the combination with a primary shaft, of a secondary shaft, a plurality of fluid turbine transmission circuits adapted to transmit power from said primary shaft to said secondary shaft, and means for transferring the operative fluid from one of said circuits to another of said circuits.

13. In a transmission device, the combination with a primary shaft, of a secondary shaft, a primary fluid turbine on said primary shaft, having a plurality of fluid energizing sections, a secondary turbine wheel on said secondary shaft, having a plurality of fluid receiving sections, and stationary guide wheels interposed between said section, adapted to form closed circuits with said sections.

14. In a transmission device, the combination with a plurality of shafts, of a turbine wheel on one of said shafts, a multiple-stage turbine wheel on another of said shafts, guiding means therebetween, and a fluid adapted to transmit the motion of one of said turbine wheels to the other of said turbine wheels.

15. In a transmission device, the combination with a plurality of shafts, of a turbine wheel on one of said shafts, a multiple-stage turbine wheel on another of said shafts, and a guide wheel interposed between said turbine wheels.

16. In a transmission device the combination with a centrifugal pump impeller and a turbine rotor coaxial therewith, of means interposed therebetween for receiving the fluid directly from the former and guiding it to the latter to rotate said rotor opposite to that of the impeller.

17. The combination with a centrifugal pump impeller and a turbine rotor coaxial therewith, the inlet to said impeller being closely adjacent to the outlet from said rotor, of means interposed between the outlet of said impeller and the inlet to said rotor for guiding the fluid from the former to the latter to rotate said rotor in a direction opposite to that of the impeller.

18. The combination with a centrifugal pump impeller and a turbine rotor coaxial therewith, the inlet to said impeller being closely adjacent to the outlet from said rotor, of stationary vanes interposed between the outlet of said impeller and the inlet to said rotor for guiding the fluid from the former to the latter to rotate said rotor in a direction opposite to that of the impeller.

19. In a transmission device the combination with a centrifugal pump impeller and a turbine rotor coaxial therewith and operated by the kinetic energy of fluid delivered from said impeller, of means concentric with said impeller and rotor for guiding the fluid from the former to the latter to rotate said rotor opposite to that of the impeller.

20. In a transmission device the combination with a centrifugal pump impeller and a turbine rotor including a plurality of circuits and separate sets of passageways delivering from said impeller to the separate circuits of said rotor and said passages containing vanes for controlling the direction of the flow of the fluid, whereby the rotor is driven in one direction with the fluid in one circuit and in the opposite direction with the fluid in the other circuit.

21. In a transmission device the combination with a centrifugal pump impeller and a turbine rotor coaxial therewith, said impeller having a plurality of sets of passages and said rotor having a plurality of sets of passages and stationary guiding means for delivering fluid from said impeller to said rotor, said means having a plurality of sets of passages corresponding to the sets of passages of said impeller and rotor, one set of passages in said stationary means serving to direct fluid to rotate the rotor in one direction and the other set of passages serving to deliver fluid to rotate the rotor in the opposite direction.

22. In a hydraulic power transmitting apparatus, the combination with a rotatable driving member, of a closed casing inclosing said driving member, a driven member located within said casing and means on said driving member adapted to move a liquid in the same centrifugally and direct the liquid to said driven member in the plane of rotation of the rotating members, whereby the driven member is actuated.

23. In a hydraulic power transmitting apparatus, the combination with a rotatable driving member, of a driven member adapted to rotate independently of said driving member, a casing inclosing said members, a plurality of vanes on said driving member, a plurality of vanes on said driven member and located concentrically with the vanes of said driving member, the vanes of said driving member being adapted to direct liquid to the vanes of said driven member in the plane of rotation of said members.

24. In a hydraulic power transmitting apparatus the combination with a driving member, of a casing inclosing said driving member, a driven member located within said casing, means on said driving member adapted to gradually increase the velocity of a liquid toward the periphery and direct the same in the plane of rotation of said rotating members to said driven member.

25. The combination with a casing, a shaft rotatably mounted therein, an impeller keyed to said shaft, a turbine wheel located within said casing, the vanes of said impeller and the vanes of said turbine wheel being located concentrically.

26. The combination with a casing, of a turbine wheel located therein, and having curved passages therethrough in a plane at right angles to the axis of rotation, an impeller located within the said casing and having passages, the outer ends of which communicate with said first mentioned passages and adapted to deliver a liquid directly to said turbine wheel in said plane whereby the same is actuated.

27. The combination with a casing, a turbine wheel located therein, an impeller located in said casing in the plane of said turbine wheel and adapted to direct liquid to said turbine wheel, whereby the same is actuated.

28. The combination with a casing, of a shaft mounted therein, an impeller fixedly secured to said shaft, a turbine wheel located in said casing, said impeller being adapted to direct liquid to said turbine wheel in the plane of rotation of said wheels and tangentially to the periphery of said impeller, whereby said turbine wheel is actuated.

29. In a hydraulic transmitting apparatus, the combination with a driving member, of a driven member, means carried by said driving member and adapted to direct the fluid at high speed to said driven member in the plane of rotation of said member and tangentially to the periphery of the driving member whereby said driven member is actuated.

30. In a hydraulic power transmitting apparatus, the combination with a rotatable driving member, of a rotatable driven member, a casing inclosing said rotatable parts, means on said driving member adapted to impart a rotary motion to liquid and direct the same to the driven member in the plane of rotation of said members and tangentially to the periphery of the driving members whereby said driven member is actuated.

In testimony whereof I have signed my name to this specification in the presence of two subscribing witnesses.

HERMANN FÖTTINGER.

Witnesses:
  LUDWIG WACHTEL,
  EMIL SCHMIDT.